United States Patent
Zhang

(10) Patent No.: US 12,406,036 B2
(45) Date of Patent: Sep. 2, 2025

(54) METHOD AND APPARATUS FOR MONITORING SOFTWARE LICENSE INFORMATION AND ADDING INFORMATION BLOCK INTO AN INFORMATION CHAIN, AND SERVER AND STORAGE MEDIUM

(71) Applicant: New H3C Technologies Co., Ltd., Zhejiang (CN)

(72) Inventor: Guangkui Zhang, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 50 days.

(21) Appl. No.: 17/906,969

(22) PCT Filed: May 20, 2020

(86) PCT No.: PCT/CN2020/091326
§ 371 (c)(1),
(2) Date: Sep. 21, 2022

(87) PCT Pub. No.: WO2021/232295
PCT Pub. Date: Nov. 25, 2021

(65) Prior Publication Data
US 2023/0104585 A1    Apr. 6, 2023

(51) Int. Cl.
*G06F 21/74*    (2013.01)
*G06F 21/10*    (2013.01)
(Continued)

(52) U.S. Cl.
CPC .......... *G06F 21/105* (2013.01); *G06F 21/602* (2013.01); *G06F 21/107* (2023.08)

(58) Field of Classification Search
CPC ............................ G06F 21/105; G06F 21/602
(Continued)

(56) References Cited

U.S. PATENT DOCUMENTS

2019/0370806 A1* 12/2019 Wang .................. G06Q 20/405
2019/0392119 A1   12/2019 Rahiman
(Continued)

FOREIGN PATENT DOCUMENTS

CN          1549135 A      11/2004
CN          103268435 A     8/2013
(Continued)

*Primary Examiner* — Haresh N Patel
(74) *Attorney, Agent, or Firm* — McDonnell Boehnen Hulbert & Berghoff LLP

(57) ABSTRACT

Examples of the present disclosure provide a method and an apparatus for monitoring license information of a software, a server and a storage medium, which relate to the technical field of software management. The solution of the examples of the present disclosure includes: generating a transaction information block every specified duration; wherein, the transaction information block includes license information, and the license information includes an available duration balance of a software to be protected when generating the transaction information block; calculating a root encryption value based on the generated transaction information block; then, generating an information block; wherein, the information block includes the root encryption value and a transaction list, and the transaction list includes transaction information blocks generated in order; adding the information block into an information chain; wherein, the information chain includes information blocks generated in order. By using this method, it is possible to avoid effective tampering of the license information of the software and improve the security.

12 Claims, 8 Drawing Sheets

(51) Int. Cl.
*G06F 21/60* (2013.01)
*H04L 9/08* (2006.01)

(58) Field of Classification Search
USPC .......................................................... 726/26
See application file for complete search history.

(56) References Cited

U.S. PATENT DOCUMENTS

| | | | |
|---|---|---|---|
| 2020/0050741 | A1 | 2/2020 | Zhu |
| 2020/0074429 | A1* | 3/2020 | Derosa-Grund ..... H04N 21/632 |
| 2020/0117367 | A1* | 4/2020 | Zhou .................... G06F 3/0671 |
| 2020/0127844 | A1* | 4/2020 | van der Laak ....... H04L 9/0637 |
| 2020/0226540 | A1* | 7/2020 | Graves ...................... H04L 9/50 |
| 2020/0374300 | A1* | 11/2020 | Manevich ........... G06F 16/2255 |
| 2020/0374301 | A1* | 11/2020 | Manevich ........... G06F 16/2379 |
| 2021/0135847 | A1* | 5/2021 | Manevich ........... G06F 16/9014 |
| 2021/0194672 | A1* | 6/2021 | Narayanam ........... G06F 9/4418 |
| 2021/0240673 | A1* | 8/2021 | Novotny ................. H04L 67/01 |
| 2021/0326352 | A1* | 10/2021 | Manevich ............... G06F 16/23 |

FOREIGN PATENT DOCUMENTS

| | | | | |
|---|---|---|---|---|
| CN | 103279696 | A | | 9/2013 |
| CN | 106815528 | A * | 6/2017 | .......... G06F 21/6218 |
| CN | 108875316 | A | | 11/2018 |
| CN | 109033841 | A * | 12/2018 | ............. G06F 21/57 |
| CN | 109472690 | A * | 3/2019 | ......... G06Q 20/3825 |
| CN | 109657499 | A | | 4/2019 |
| CN | 109691008 | A * | 4/2019 | ............. G06F 16/27 |
| CN | 110971663 | A * | 4/2020 | ......... G06F 16/2471 |
| CN | 111400701 | A * | 7/2020 | |
| CN | 111797367 | A * | 10/2020 | ............. G06F 21/12 |
| CN | 109756573 | B * | 2/2022 | |
| CN | 112400299 | B * | 6/2022 | |
| CN | 111062811 | B * | 1/2024 | ............. G06F 21/64 |
| EP | 3588300 | A1 * | 1/2020 | ......... G06F 11/1446 |
| JP | 2009517785 | A | | 4/2009 |
| JP | 2019511759 | A | | 4/2019 |
| JP | 2019075755 | A | | 5/2019 |
| JP | 2019106180 | A | | 6/2019 |
| JP | 2020526050 | A * | 8/2020 | |
| KR | 20190045754 | A * | 5/2019 | |
| WO | WO-2008115647 | A1 * | 9/2008 | ........... G06F 21/105 |
| WO | 2018154489 | A1 | | 8/2018 |
| WO | 2019207504 | A1 | | 10/2019 |
| WO | WO-2020063354 | A1 * | 4/2020 | ............. H04L 9/085 |

* cited by examiner

METHOD AND APPARATUS FOR MONITORING SOFTWARE LICENSE INFORMATION AND ADDING INFORMATION BLOCK INTO AN INFORMATION CHAIN, AND SERVER AND STORAGE MEDIUM

The present disclosure is a U.S. National Phase Application under 35 U.S.C. § 371 of International Application No. PCT/CN2020/091326 filed May 20, 2020, and entitled "Method and Apparatus for Monitoring Software License Information, and Server and Storage Medium", which is incorporated herein by reference in their entirety.

TECHNICAL FIELD

The present disclosure relates to the technical field of software management, and in particular to a method and an apparatus for monitoring license information of a software, a server and a storage medium.

BACKGROUND

Commercial software generally require license control, thereby limiting users' rights to use the commercial software. The license control refers to controlling users to use a software within their own rights based on the license information. The license information of the software may include the effective time, the duration of legal use and the number of license nodes for the software.

The duration of legal use refers to duration that a user can legally use the software, such as 60 days, 365 days, etc. When the user uses the software for more than the duration of legal use, the software functions will be limited or unavailable. The number of license nodes is the maximum number of nodes that can use the software. For example, if a user purchases the right to use the software gateway for one year, and the software gateway allows up to 100 routers to be accessed, then the duration of legal use of the software gateway is 365 days and the number of license nodes is 100. When 100 routers have accessed the software gateway, if a new router requests to access the software gateway, the software gateway rejects the access request of the router.

The license control is mainly to avoid tampering of the license information. The current license control method is: during software deployment, obtaining the hardware information of the host where the software is located; wherein, the hardware information includes but is not limited to the host's network card media access control (MAC) address, hard disk serial number; then generating a key based on the hardware information, and encrypting the license information to form a cipher text by using the key; while the software is running, decrypting the cipher text to obtain the license information, and performing the license control based on the obtained license information.

However, the encryption of the license information depends on the hardware information of the host. If the host is a virtual machine or the host is in a containerized scenario, it is difficult to obtain the hardware information of the host, and it is difficult to effectively protect the license information. In addition, even if the hardware information of the host may be obtained and the encryption is performed by using the hardware information, in case a tamperer also obtains the hardware information of the host, he may decrypt the cipher text, and the license information has a risk of being tampered, resulting in the poor security.

SUMMARY

The purpose of the examples of the present disclosure is to provide a method and an apparatus for monitoring license information of a software, a server and storage medium, so as to avoid effective tampering of the license information and improve the security. The following specific technical solutions are provided.

In a first aspect, an example of the present disclosure provides a method for monitoring license information of a software, which is applied to a server. The method includes:
  generating a transaction information block every specified duration; wherein, the transaction information block includes license information, and the license information includes an available duration balance of a software to be protected when generating the transaction information block;
  calculating a root encryption value based on the generated transaction information block;
  generating an information block; wherein, the information block includes the root encryption value and a transaction list, and the transaction list includes transaction information blocks generated in order;
  adding the information block into an information chain; wherein, the information chain includes information blocks generated in order.

In a possible implementation, the available duration balance of the software to be protected is determined through the following operations:
  acquiring a current system time and an effective time of the software to be protected;
  determining a used duration of the software to be protected based on a difference value between the current system time and the effective time of the software to be protected;
  determining the available duration balance of the software to be protected based on a difference value between a total available duration of the software to be protected and the used duration.

In a possible implementation, after generating an information block, the method further includes:
  broadcasting the information block to a backup node of the server and/or an external cache to form a backup information chain of the information chain in the backup node and/or the external cache.

In a possible implementation, the information block includes header information, and the header information includes the root encryption value and a parent encryption value;
  the method further includes:
  acquiring header information of a previous information block generated before the information block;
  calculating the parent encryption value based on the acquired header information of the previous information block.

In a possible implementation, generating an information block, includes:
  generating a data portion of the information block; wherein, the data portion includes a current available duration balance of the software to be protected;
  calculating an encryption value of the information block based on the data portion of the information block;
  adding the encryption value of the information block into the header information of the information block.

In a possible implementation, calculating a root encryption value based on the generated transaction information block, includes:

for the generated one or more transaction information blocks, calculating respectively an encryption value of each of the transaction information blocks, based on the license information of each of the transaction information blocks by using a preset encryption algorithm;

calculating a component encryption value based on the preset encryption algorithm and the encryption values of the one or more transaction information blocks;

calculating the root encryption value based on the component encryption value by using the preset encryption algorithm.

In a second aspect, the present disclosure provides a method for monitoring license information of a software, applied to a server; wherein, license information of a software to be protected is stored in a form of an information chain;

the information chain includes information blocks established in order; each of the information blocks includes a transaction list and a root encryption value; wherein, the transaction list includes transaction information blocks generated in order; each of the transaction information blocks include license information; the license information includes an available duration balance of the software to be protected when generating the transaction information block; the root encryption value is obtained by performing encryption based on the license information;

the method includes:

calculating a root encryption value based on each of transaction information blocks included in a transaction list of an information block to be verified;

comparing the calculated root encryption value with a root encryption value stored in the information block to be verified;

determining whether the license information of the software to be protected has been tampered based on a comparison result.

In a possible implementation, the information block includes header information, and the header information includes the root encryption value and a parent encryption value; wherein, the parent encryption value is an encryption value obtained based on the header information of a previous information block generated before a current information block; the method further includes:

acquiring the header information of the previous information block of the information block to be verified;

calculating the encryption value based on the acquired header information of the previous information block;

comparing the encryption value calculated based on the header information of the previous information block with a parent encryption value stored in the information block to be verified;

determining whether the license information of the software to be protected has been tampered based on a comparison result.

In a possible implementation, the header information of the information block further includes an encryption value of the information block, the encryption value of the information block is an encryption value calculated based on a data portion of the information block, the data portion of the information block includes the license information of the software to be protected when generating the information block;

the method further includes:

calculating an encryption value of the information block to be verified based on a data portion of the information block to be verified;

comparing the calculated encryption value of the information block to be verified with an encryption value, of the information block to be verified, stored in the information block to be verified;

determining whether the license information of the software to be protected has been tampered based on a comparison result.

In a possible implementation, calculating a root encryption value based on license information of each of transaction information blocks included in a transaction list of an information block to be verified, includes:

for one or more transaction information blocks included in the transaction list of the information block to be verified, calculating respectively an encryption value of each of the transaction information blocks based on license information of each of the transaction information blocks by using a preset encryption algorithm;

calculating a component encryption value based on the preset encryption algorithm and encryption values of the one or more transaction information blocks;

calculating the root encryption value based on the component encryption value by using the preset encryption algorithm.

In a possible implementation, calculating a component encryption value based on the preset encryption algorithm and encryption values of the one or more transaction information blocks, includes:

for every preset number of consecutive transaction information blocks in the transaction list of the information block to be verified, calculating a paragraph encryption value based on encryption values of the preset number of consecutive transaction information blocks by using the preset encryption algorithm;

calculating the component encryption value based on calculated at least one paragraph encryption value by using the preset encryption algorithm.

In a possible implementation, the method further includes:

determining whether an available duration balance included in each of the transaction information blocks in the transaction list included in the information block to be verified is smaller than an available duration balance included in a preamble transaction information block by comparison;

determining whether the available duration balance of the software to be protected has been tampered based on a comparison result.

In a possible implementation, the method further includes:

acquiring a latest generated information block in a backed-up information chain from a backup node and/or an external cache, comparing the information block acquired from the backup node and/or the external cache with the information block to be verified;

determining whether the license information of the software to be protected has been tampered based on a comparison result.

In a third aspect, the present disclosure provides an apparatus for monitoring license information of a software, which is applied to a server. The apparatus includes:

a generation module, to generate a transaction information block every specified duration; wherein, the transaction information block includes license information, and the license information includes an available duration balance of a software to be protected when generating the transaction information block;

a calculation module, to calculate a root encryption value based on the generated transaction information block;

the generation module, is further to generate an information block; wherein, the information block includes the root encryption value and a transaction list, and the transaction list includes transaction information blocks generated in order;

a storage module, to add the information block into an information chain; wherein, the information chain includes information blocks generated in order.

In a possible implementation, the generation module is specifically to determine the available duration balance of the software to be protected through the following operations:

acquiring a current system time and an effective time of the software to be protected;

determining a used duration of the software to be protected based on a difference value between the current system time and the effective time of the software to be protected;

determining the available duration balance of the software to be protected based on a difference value between a total available duration of the software to be protected and the used duration.

In a possible implementation, the apparatus further includes:

a broadcasting module, to broadcast the information block to a backup node of the server and/or an external cache to form a backup information chain of the information chain in the backup node and/or the external cache.

In a possible implementation, the information block includes header information, and the header information includes the root encryption value and a parent encryption value;

the calculation module is further to:

acquire header information of a previous information block generated before the information block;

calculate the parent encryption value based on the acquired header information of the previous information block.

In a possible implementation, the generation module is specifically to:

generate a data portion of the information block; wherein, the data portion includes a current available duration balance of the software to be protected;

calculate an encryption value of the information block based on the data portion of the information block;

add the encryption value of the information block into the header information of the information block.

In a possible implementation, the calculation module is specifically to:

for the generated one or more transaction information blocks, calculate respectively an encryption value of each of the transaction information blocks, based on the license information of each of the transaction information blocks by using a preset encryption algorithm;

calculate a component encryption value based on the preset encryption algorithm and the encryption values of the one or more transaction information blocks;

calculate the root encryption value based on the component encryption value by using the preset encryption algorithm.

In a fourth aspect, an example of the present disclosure provides an apparatus for monitoring license information of a software, applied to a server; wherein, license information of a software to be protected is stored in a form of an information chain;

the information chain includes information blocks established in order; each of the information blocks includes a transaction list and a root encryption value; wherein, the transaction list includes transaction information blocks generated in order; each of the transaction information blocks include license information; the license information includes an available duration balance of the software to be protected when generating the transaction information block; the root encryption value is obtained by performing encryption based on the license information;

the apparatus includes:

a calculation module, to calculate a root encryption value based on each of transaction information blocks included in a transaction list of an information block to be verified;

a verification module, to compare the calculated root encryption value with a root encryption value stored in the information block to be verified, and determine whether the license information of the software to be protected has been tampered based on a comparison result.

In a possible implementation, the information block includes header information, and the header information includes the root encryption value and a parent encryption value; wherein, the parent encryption value is an encryption value obtained based on the header information of a previous information block generated before a current information block; the apparatus further includes:

an acquisition module, to acquire the header information of the previous information block of the information block to be verified;

wherein, the calculation module is further to calculate the encryption value based on the acquired header information of the previous information block;

the verification module is further to compare the encryption value calculated based on the header information of the previous information block with a parent encryption value stored in the information block to be verified, and determine whether the license information of the software to be protected has been tampered based on a comparison result.

In a possible implementation, the header information of the information block further includes an encryption value of the information block, the encryption value of the information block is an encryption value calculated based on a data portion of the information block, the data portion of the information block includes the license information of the software to be protected when generating the information block;

the calculation module is further to calculate an encryption value of the information block to be verified based on a data portion of the information block to be verified;

the verification module is further to compare the calculated encryption value of the information block to be verified with an encryption value, of the information block to be verified, stored in the information block to be verified, and determine whether the license information of the software to be protected has been tampered based on a comparison result.

In a possible implementation, the calculation module is specifically to:

for one or more transaction information blocks included in the transaction list of the information block to be verified, calculate respectively an encryption value of each of the transaction information blocks based on license information of each of the transaction information blocks by using a preset encryption algorithm;

calculate a component encryption value based on the preset encryption algorithm and encryption values of the one or more transaction information blocks;

calculate the root encryption value based on the component encryption value by using the preset encryption algorithm.

In a possible implementation, the calculation module is specifically to:

for every preset number of consecutive transaction information blocks in the transaction list of the information block to be verified, calculate a paragraph encryption value based on encryption values of the preset number of consecutive transaction information blocks by using the preset encryption algorithm;

calculate the component encryption value based on calculated at least one paragraph encryption value by using the preset encryption algorithm.

In a possible implementation, the verification module is further to:

determine whether an available duration balance included in each of the transaction information blocks in the transaction list included in the information block to be verified is smaller than an available duration balance included in a preamble transaction information block by comparison;

based on a comparison result, determine whether the available duration balance of the software to be protected has been tampered.

In a possible implementation, the acquisition module is further to acquire a latest generated information block in a backed-up information chain from a backup node and/or an external cache, the verification module is further to compare the information block acquired from the backup node and/or the external cache with the information block to be verified, and determine whether the license information of the software to be protected has been tampered based on a comparison result.

In a fifth aspect, an example of the present disclosure further provides a server, including a processor, a communication interface, a memory and a communication bus; wherein, the processor, the communication interface and the memory communicate with each other via the communication bus;

the memory is to store a computer program;

the processor is to implement the operations of the method in the first aspect when executing the computer program stored in the memory.

In a sixth aspect, an example of the present disclosure further provides a server, including a processor, a communication interface, a memory and a communication bus; wherein, the processor, the communication interface and the memory communicate with each other via the communication bus;

the memory is to store a computer program;

the processor is to implement the operations of the method in the second aspect when executing the computer program stored in the memory.

In a seventh aspect, an example of the present disclosure further provides a computer readable storage medium. The computer readable storage medium stores a computer program therein. Wherein, the computer program, when executed by a processor, implements the method in the first aspect.

In an eighth aspect, an example of the present disclosure further provides a computer readable storage medium. The computer readable storage medium stores a computer program therein. Wherein, the computer program, when executed by a processor, implements the method in the second aspect.

In a ninth aspect, an example of the present disclosure also provides a computer program product including instructions that, when executed by a computer, cause the computer to perform the method in the first aspect.

In a tenth aspect, an example of the present disclosure also provides a computer program product including instructions that, when executed by a computer, cause the computer to perform the method in the second aspect.

With the above technical solution, the root encryption value is calculated based on the generated license information included in each of the transaction information blocks. If the license information included in any of the transaction information blocks is tampered, this will cause the root encryption value to change. In the examples of the present disclosure, the root encryption value is calculated based on each of the transaction information blocks included in the transaction list of the information block to be verified, and by comparing the calculated root encryption value with the stored root encryption value, it can be determined whether the license information has been tampered. Because the hardware information is not used when generating the root encryption value, it is difficult to tamper the root encryption value as long as the tamperer does not know the encryption algorithm used in the examples of the present disclosure. Even if the tamperer has tampered the information in all transaction information blocks, as long as the root encryption value has not been tampered, tampering of the license information can be found through the above process, and thus the use of tampered license information can be avoided. Therefore, by using the above method for monitoring license information of a software, the security of the license information of the software can be improved without using the hardware information of the host.

Of course, any of the products or methods implementing the present disclosure is not necessarily required to achieve all of the advantages described above at the same time.

BRIEF DESCRIPTION OF THE DRAWINGS

In order to more clearly describe the technical solutions of the examples of the present disclosure and the prior art, accompanying drawings that need to be used in examples and the prior art will be briefly described below. Obviously, accompanying drawings described below are for only some of examples of the present disclosure; those skilled in the art may also obtain other accompanying drawings based on these accompanying drawings without any creative efforts.

DETAILED DESCRIPTION

Figure 1:
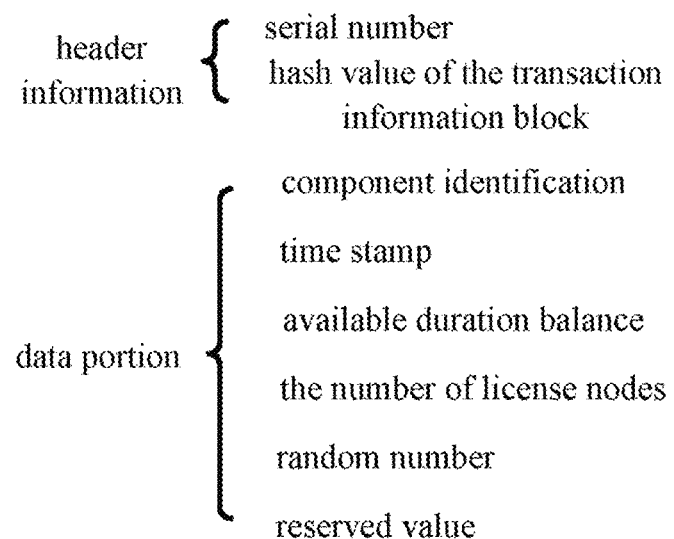
FIG. 1 is an exemplary schematic diagram of a data structure of a transaction information block provided by an example of the present application.

In order to make the objective, technical solutions and advantages of the present disclosure clearer and more understandable, the present disclosure will be described in more detail below with reference to the accompanying drawings and examples. Obviously, the described examples are only some, and not all, of the examples of the present disclosure. All other examples obtained based on the examples of the present disclosure by those skilled in the art without any creative efforts fall into the scope of protection of the present disclosure.

In the related art, the license information of the software is generally encrypted by hardware information. If the host where the software is located is a physical machine, the hardware information of the physical machine may be collected through the corresponding function of the operating system. If the host where the software is located is a virtual machine, since the hardware information of the virtual machine is virtual and variable, the virtualization software of the manufacturer of the virtual machine is needed to collect the hardware information of the physical machine where the virtual machine is located. If the virtualization software does not support the function of acquiring the hardware information of the physical machine, the hardware information of the physical machine cannot be obtained.

In addition, if the software is deployed in a container, due to the portability and dynamic characteristics of the container, the physical machine where the software is located is prone to change. Therefore, in a containerized scenario, it is difficult to obtain the hardware information of the physical machine where the software is located. Therefore, it is difficult to encrypt the license information of the software by using the hardware information of the physical machine.

At present, a large-scale software generally adopts a distributed cluster architecture system, and license information will also be stored in a distributed manner. The manner for encrypting the license information by using hardware information of a host is not suitable for the distributed cluster. Therefore, the usage scenarios in which the manner for protecting the license information through hardware information is applied are limited, and the security is poor.

In order to solve the above problems, an example of the present disclosure provides a method for monitoring license information of a software.

Because the license information of the software is relatively sensitive data, the server needs to monitor the license information of the software, so as to ensure that the license information of the installable software is not tampered.

The disclosure takes for example the hash algorithm as the encryption algorithm to introduce the data structure of transaction information blocks, information blocks and information chains involved in the disclosure. It should be understood that the encryption algorithm is not limited to only the hash algorithm. For example, the present disclosure may also use other encryption algorithms such as a shift encryption algorithm to calculate the encryption value.

In the method for monitoring license information of a software provided by the present disclosure, for the software to be protected, the server may generate a transaction information block based on the license information of the software every day. Of course, the frequency for generating the transaction information block may also be generating one transaction information block every two days, or generating two transaction information blocks every day, and there is no limit to the frequency for generating transaction information block.

(1) As shown in FIG. 1, FIG. 1 is a schematic diagram of a data structure of a transaction information block in an example of the present disclosure. The transaction information block includes header information and a data portion.

The header information of the transaction information block includes: the serial number of the transaction information block and a hash value of the transaction information block. The hash value of the transaction information block is a hash value obtained by performing a hash operation using the data portion of the transaction information block.

The data portion of the transaction information block includes: an available duration balance. The available duration balance is the remaining available time for which the software to be protected is authorized to be used.

Optionally, the data portion of the transaction information block may further include: at least one of component identifier, time stamp, the number of license nodes, random number, and reserved fields. Wherein, since the software component may also be used as an independent software product for development or usage of consumers, the component identifier may be used to characterize which component the generated transaction information block is generated for. The time stamp is a system time when the transaction information block is generated. By adding a random number, the encryption or decryption method for calculating the transaction information block may be more complicated, which improve the difficulty of tampering the hash value of the transaction information block. The random number may be a 16-bit random number. The reserved field is to subsequently expand the content of the data portion of the transaction information block.

(2) After the transaction information block is generated, the encryption may be performed based on the generated transaction information block to obtain a data structure composed of encryption values.

Figure 2:
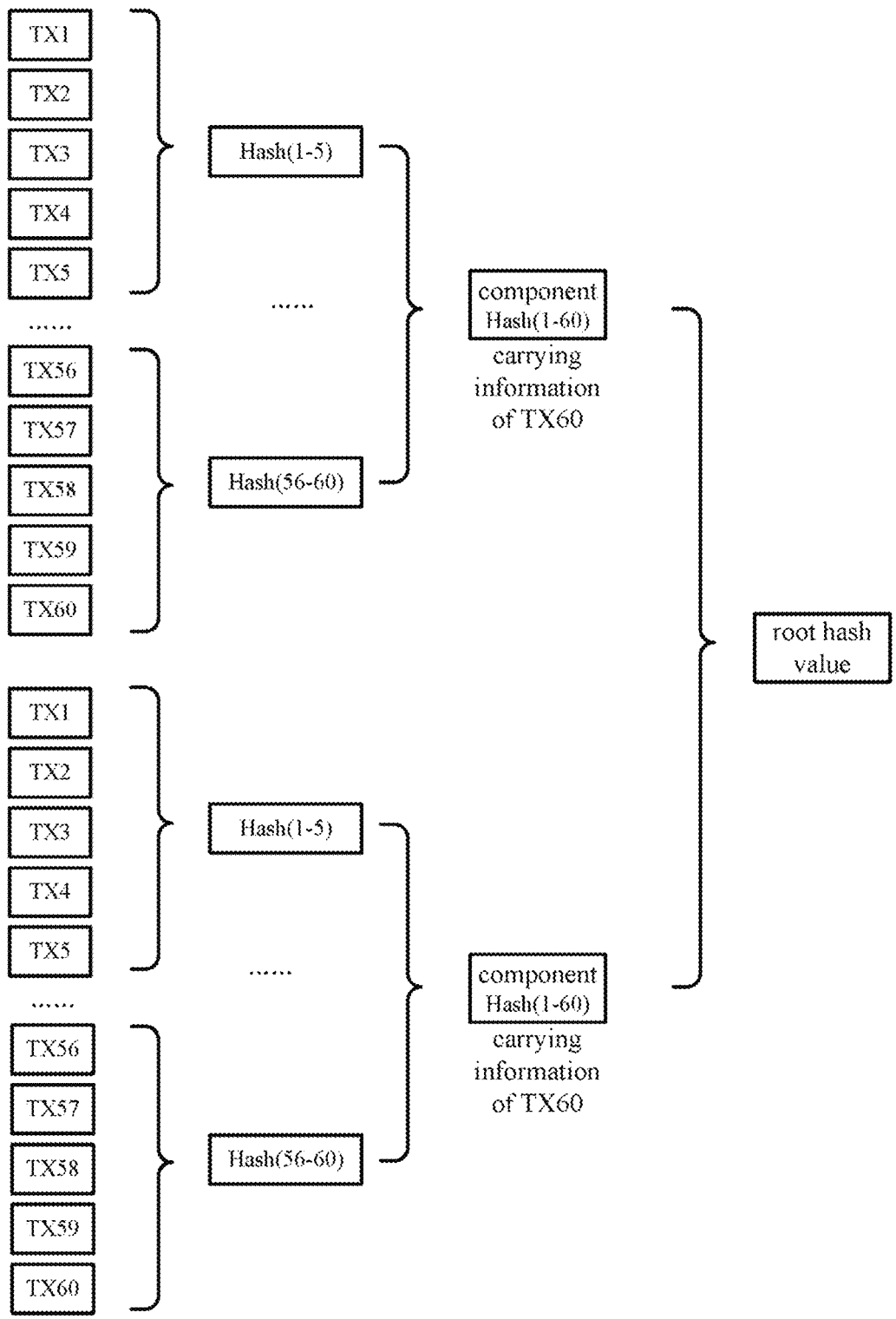
FIG. 2 is an exemplary schematic diagram of a data structure of a hash tree provided by an example of the present disclosure.

The example takes for example the hash algorithm as the encryption algorithm to explain the concepts involved in the method of the present disclosure. In the case of using the hash algorithm as the encryption algorithm, a hash tree may be generated based on the generated transaction information block. As shown in FIG. 2, FIG. 2 is a schematic diagram of a data structure of a hash tree in an example of the present disclosure. It is assumed that the software to be protected includes two components, a component 1 and a component 2, respectively. In FIG. 2, each TX represents a data portion of a transaction information block, or each TX represents a transaction information block. It is assumed that the component 1 and component 2 have been used for 60 days currently, then 60 transaction information blocks have been generated for the component 1, which specifically correspond to TX1 to TX60 in the upper half part of FIG. 2; and 60 transaction information blocks have been generated for the component 2 currently, which specifically correspond to TX1 to TX60 in the lower half part of FIG. 2.

The hash values of every 5 TXs are jointed respectively, and then hash operation may be performed on the jointed results to obtain paragraph hash values.

Then, the all paragraph hash values corresponding to the same component are jointed, and then the hash operation is performed on the jointed results to obtain the component hash value.

Taking the component 1 as an example, the hash values of TX1-TX5 are jointed, and then the hash operation is performed on the jointed result to obtain the paragraph hash value for TX1-TX5, as shown by Hash (1-5) in FIG. 2 in detail. Calculating the paragraph hash value for TX6-TX10, the paragraph hash value for TX10-TX15, until calculating the paragraph hash value for TX56-TX60, then 12 paragraph hash values of the component 1 may be obtained.

The 12 paragraph hash values of the component 1 are jointed, and then the hash operation is performed on the jointed result to obtain the component hash value of the component 1, as shown by the component Hash (1-60) in FIG. 2 in detail. In this example, the component hash information including the component hash value and the data portion of the currently lastly generated transaction information block for the component is taken as an example for description. Then, the component hash information of the component 1 includes: the component hash value of the component 1 and the information of TX60 of the component 1.

Based on the same calculation method, the component hash information of the component 2 may be obtained. The component hash information of the component 2 includes: the component hash value of the component 2 and the information of the TX60 of the component 2.

The component hash value of the component 1 and the component hash value of the component 2 are jointed, and then the hash operation is performed on the jointed result to obtain a root hash value.

If the software to be protected includes only one component, for example, only the component 1, after the paragraph hash values of the component 1 are obtained, the paragraph hash values of the component 1 are jointed and the hash operation is performed on the jointed result to obtain the root hash value.

In the above calculation process, every 5 transaction information blocks are used as one paragraph to calculate the paragraph hash value. If there are currently less than 5 transaction information blocks generated, for example, there are only 4 transaction information blocks, the paragraph hash value is calculated based on the hash values of the 4 transaction information blocks. Or, 53 transaction information blocks have been generated currently, and then the last calculated paragraph hash value is the paragraph hash value for TX50 to TX53.

In the above, calculating the paragraph hash value based on the hash values of every 5 transaction information blocks is taken as an example, in actual implementation, it is not limited to 5, but may be for example 2 or 3.

Figure 3:
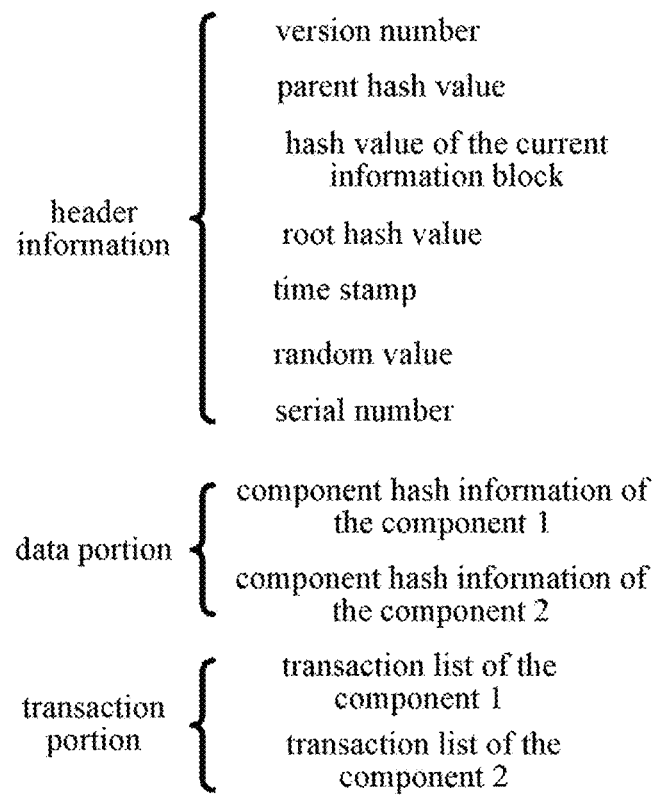
FIG. 3 is an exemplary schematic diagram of a data structure of an information block provided by an example of the present disclosure.

(3) After the hash tree shown in FIG. 2 is obtained, an information block may be generated based on the hash tree and the transaction list. As shown in FIG. 3, FIG. 3 is a schematic diagram of a data structure of an information block in an example of the present disclosure. The information block further includes header information and a data portion in terms of the data structure, in addition, the information block further includes a transaction portion. The header information of the information block is to store hash values generated based on the transaction information blocks. Wherein, the header information of the information block may include one or more of a parent hash value, a hash value of the current information block and the root hash value. Optionally, the header information may further include one or more of a time stamp, a random value and a serial number. The parent hash value is a hash value obtained by performing a hash operation on the header information of the previous information block generated before the current information block. For example, in chronological order, an information block 1, an information block 2, an information block 3 and an information block 4 have been generated, and the information block currently being generated is an information block 5; then the parent hash value included in the header information of the information block 5 is a hash value obtained by performing a hash operation on the header information of the information block 4.

The hash value of the current information block is a hash value obtained by performing a hash operation on the data portion of the current information block.

The root hash value is the root hash value in FIG. 2.

The times tamp is a system time when the current information block is generated.

The serial number included in the header information is the serial number of the current information block. For example, if the current information block is the fifth information block generated for the software to be protected, the serial number included in the header information is 5.

The data portion of the information block is to store the component hash information. For example, the data portion of the information block includes the component hash information in FIG. 2, that is, the component hash information of the component 1 and the component hash information of the component 2.

The transaction portion of the information block is to store the data portions of the transaction information blocks that have been generated for each of the components. For example, the transaction part of the information block may include the transaction list of the component 1 and the transaction list of the component 2; wherein the transaction list of the component 1 includes TX1-TX60 that have been currently generated for the component 1, and the transaction list of the component 2 includes TX1-TX60 that have been currently generated for the component 2.

Figure 4:
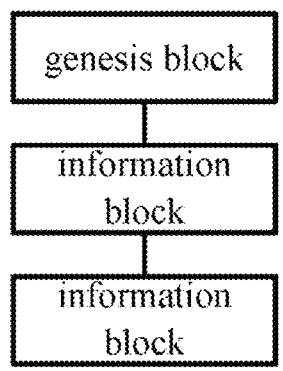
FIG. 4 is an exemplary schematic diagram of a data structure of an information chain provided by an example of the present disclosure.

(4) A data structure formed in a certain order based on the generated information blocks is called an information chain in this disclosure. As shown in FIG. 4, FIG. 4 is a schematic diagram of a data structure of an information chain provided by an example of the present disclosure.

Wherein, the information chain includes the information blocks established in order. Wherein, the first information block generated in the information chain is called the genesis block in this disclosure, and the data structure of the genesis block is the same as that of other information blocks. In terms of content, the genesis block includes a duration that the components are authorized to be used, that is, the total available duration of the components.

FIG. 4 exemplarily shows two information blocks generated after the generation of the genesis block. In actual implementation, the number of information blocks is not limited to this.

As an example, one transaction information block may be generated every day, and the above-mentioned hash tree can be calculated based on all the generated transaction information blocks, thereby creating one information block every day, that is, adding one information block into the information chain shown in FIG. 4 every day.

The method for monitoring license information of a software provided by the example of the present disclosure may be applied in a distributed cluster system; wherein the distributed cluster system includes multiple servers, and the flow path of the method provided by the example of the present disclosure may be performed by an server included in the distributed cluster system.

In an example, a license apparatus may be deployed in the distributed cluster system where the software to be protected is located, and the license apparatus is a process or a part of a process. The license apparatus may be specifically deployed in any server of the distributed cluster system, and the license apparatus is to implement the flow path of the method provided by the example of the present disclosure.

Optionally, multiple license apparatuses may be deployed in the distributed cluster system, with one of the license apparatuses as s master node and the other license apparatuses as backup nodes. The master node is to store and/or verify the license information of the software to be protected. The backup nodes are to verify the license information of the software to be protected.

Figure 5:
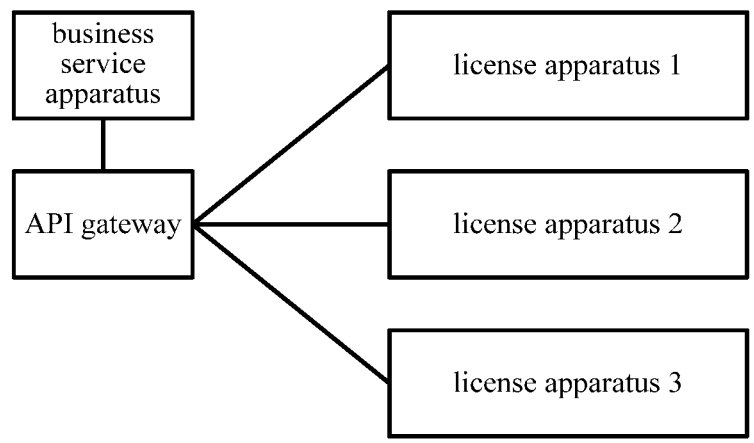
FIG. 5 is a schematic diagram of relationships between apparatuses in a distributed cluster system provided by an example of the present disclosure.

FIG. 5 is a schematic diagram of relationships between apparatuses in a distributed cluster system provided by an example of the present disclosure. As shown in FIG. 5, taking three license apparatuses deployed in the distributed cluster system as an example, namely a license apparatus 1, a license apparatus 2 and a license apparatus 3, respectively, each of the license apparatuses has a function of reading and writing data.

A business service apparatus may communicate with the license apparatus 1, the license apparatus 2 and the license apparatus 3 through an application programming interface (API) gateway.

The business service apparatus is used for software license control of the software to be protected, and is specifically to manage the use of the software to be protected by the user. For example, the business service apparatus may determine whether the user has the right to use the software to be protected based on the license information of the software to be protected.

That is, the API gateway may implement routing and load balancing functions.

The business service apparatus may send a read request to the API gateway. When the API gateway receives the read request sent by the business service apparatus, the API gateway may forward the read request to one of the license apparatuses in FIG. 5 through a load balancing strategy or randomly. Therefore, the license apparatus reads the license information of the software to be protected and sends it to the business service apparatus through the API gateway, and then the business service apparatus performs the software license control based on the read license information.

The writing function of the license apparatus may realize the writing of the license information of the software to be protected, and realize the anti-tampering function of the license information.

The license apparatuses, the API gateway, and the business service apparatus in FIG. 5 are all software deployed in the distributed cluster system. The license apparatuses, the API gateway and the business service apparatus may be specifically deployed in one server in the distributed cluster system, or may be deployed in multiple servers in the distributed cluster system.

Figure 6:
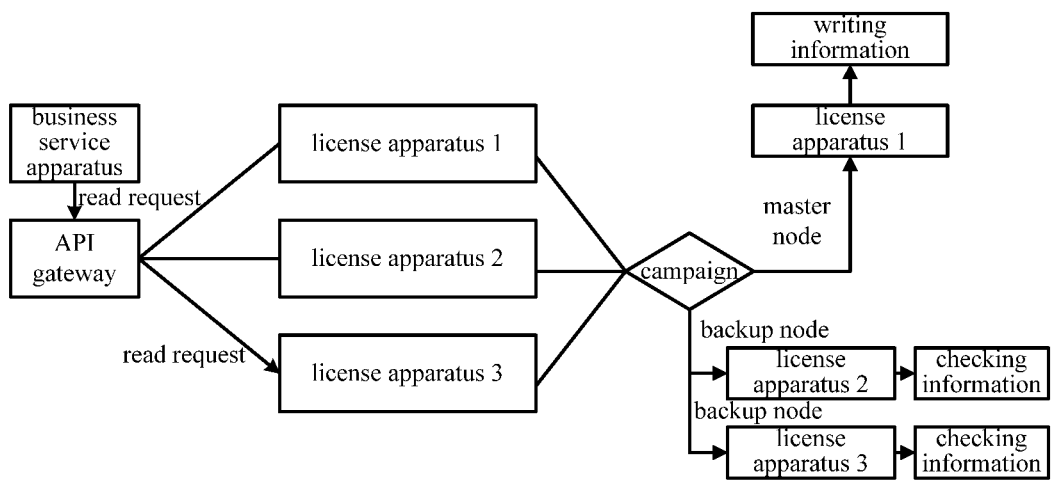
FIG. 6 is an exemplary schematic diagram of license apparatuses implementing reading and writing functions provided by an example of the present disclosure.

As shown in FIG. 6, FIG. 6 is an exemplary schematic diagram of license apparatuses implementing reading and writing functions provided by an example of the present disclosure. The business service apparatus may request to read the license information stored in the license apparatuses through the API gateway. The license apparatuses write the latest license information every specified duration. The three license apparatuses in FIG. 6 may select one license apparatus as the master node through a campaign mechanism, and the remaining two license apparatuses are used as backup nodes.

In FIG. 6, that the license apparatus 1 is the main node and the license apparatus 2 and the license apparatus 3 are the backup nodes is taken as an example, the license apparatus 1 writes information every specified duration, that is, generates the latest license information of the software to be protected and stores the license information.

After the license apparatus 1 generates the license information, the license apparatus 1 synchronizes the generated license information to the license apparatus 2 and the license apparatus 3, and the license apparatus 2 and the license apparatus 3 verify the stored license information every preset duration, thereby preventing the license information from being tampered. Optionally, the license apparatus 1 may also verify the stored license information every preset duration.

Wherein, the period in which the master node writes the license information may be the same as the period in which the backup nodes verify the license information, for example, the master node writes the license information once a day. Accordingly, the backup nodes verify the license information once a day. Or, to enhance security, the backup nodes may also shorten the verification period, such as verifying once an hour.

In FIG. 6, that after the API gateway receives the read request, the API gateway forwards the read request to the license apparatus 3 based on the load balancing strategy is taken as an example, the license apparatus 3 may process the read request subsequently.

It should be noted that if there is only one license apparatus in the system shown in FIG. 5, the license apparatus may complete the writing and verification of the license information.

In order to facilitate understanding, the relevant content involved in the example of the present disclosure will be explained firstly.

The example of the present disclosure may store and verify the license information at the granularity of software or at the granularity of components included in the software.

If the software is used as the granularity, the license information of the software to be protected is stored and verified. The license information of the software to be protected includes the available duration balance of the software to be protected, and optionally, further includes the number of license nodes of the software to be protected.

If the components are used as the granularity, the license information of each of the components included in the software to be protected is stored and verified. The license information of a component includes the available duration balance of the component, and optionally, further includes the number of license nodes of the component.

The preset encryption algorithm used in the process of storing and verifying the license information in the example of the present disclosure may be a hash algorithm, a shift algorithm, or the like.

That the component is used as the granularity and the used preset encryption algorithm is used as the hash algorithm is taken as an example below.

It should be understood that, because the present disclosure does not limit the type of the used encryption algorithm, based on the paragraph hash values, the component hash values, the component hash information and the root hash value in the above example, the meaning of the following concepts involved in the present disclosure can be known:
- a paragraph encryption value: the encryption calculation will be performed based on the encryption values of the preset number of consecutive transaction information blocks, to obtain an encryption value called the paragraph encryption value;
- a component encryption value: an encryption value obtained by performing the encryption calculation based on at least one or more paragraph encryption values generated for the same component is called the component encryption value;
- component encryption information: the component encryption information may be determined based on the component encryption value and the currently lastly generated transaction information block for the component. The component encryption information may include the entire content of the lastly generated transaction information block, or include the data portion of the lastly generated transaction information block, or include only the available duration balance and the number of license nodes of the lastly generated transaction information block. Specifically, the component encryption information may be selected based on actual needs;
- a root encryption value: an encryption value obtained by performing the encryption calculation based on the component encryption values of different components or the component encryption value of the same component is called the root encryption value.

The parent encryption value is an encryption value obtained by encryption-calculating the header information of the previous information block generated before the current information block.

The method for monitoring license information of a software provided by the example of the present disclosure will be described in detail below with reference to FIGS. 1 to 6.

Figure 7:
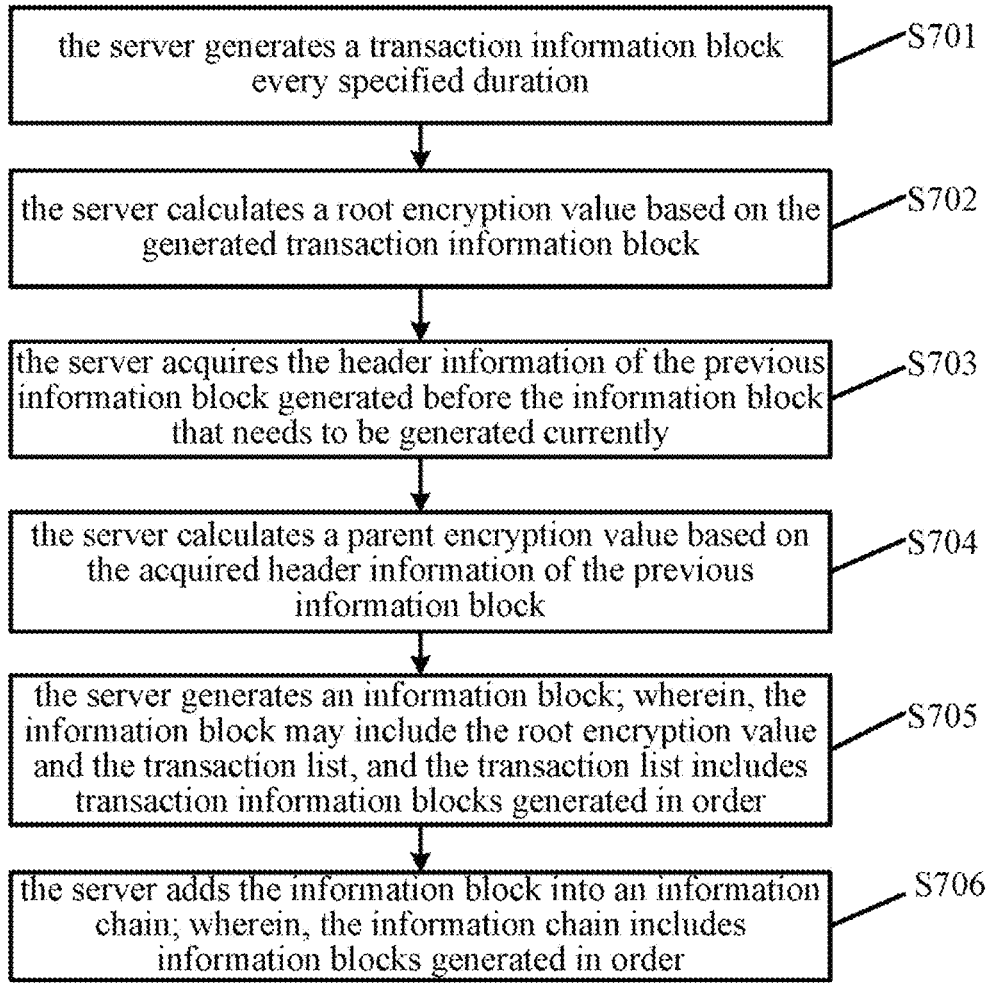
FIG. 7 is a flow chart of a method for monitoring license information of a software provided by an example of the present disclosure.

As shown in FIG. 7, an example of the present disclosure provides a method for monitoring license information of a software, which is applied to a server. The method includes:

At S701, the server generates a transaction information block every specified duration.

In one example, a transaction information block of the software to be protected is generated every specified duration; wherein, the transaction information block includes license information, and the license information includes the available duration balance of the software to be protected when generating the transaction information block.

Wherein, the server needs to monitor information such as the time when the software is licensed to be used and the nodes that are licensed to be used. In the present disclosure, the software monitored by the server are called the software to be protected, and a software to be protected may be multiple components included in a software, or may be an independently used software.

Taking the software to be protected including the component 1 and the component 2 as an example, if the specified duration is 1 day, one transaction information block is generated for the component 1 every day, and one transaction information block is generated for the component 2 every day.

It can be understood that the available duration balance included in the generated transaction information blocks every day gradually decreases.

Optionally, the license information further includes the number of license nodes. The transaction information block may further include other information, specifically referring to FIG. 1.

At S702, the server calculates a root encryption value based on the generated transaction information block.

This operation may be specifically implemented as follows: for the generated one or more transaction information blocks, the server calculates respectively the encryption value of each of the transaction information blocks, based on the license information of each of the transaction information blocks by using a preset encryption algorithm; then, the server calculates the component encryption value based on the preset encryption algorithm and the encryption values of the one or more transaction information blocks, and calculates the root encryption value based on the component encryption value by using the preset encryption algorithm.

Wherein, if it is currently the first day that the user is authorized to use the software to be protected, that is to say, only one transaction information block is currently generated, the server calculates the root encryption value based on the one transaction information block. If it is not the first day that the user is authorized to use the software to be protected, the server calculates the root encryption value based on the generated multiple transaction information blocks.

Taking that the preset encryption algorithm is the hash algorithm as an example, the encryption values involved in the example of the present disclosure may all be hash values.

For each of the generated transaction information blocks, referring to the data structure of the transaction information block shown in FIG. 1, the license information of the transaction information block includes the available duration balance. In order to improve the security, other information in the data portion in FIG. 3 may also be included. By performing the hash operation on the data portion of each of the transaction information blocks respectively, the hash value of each of the transaction information blocks may be obtained.

Then, based on the hash value of each of the generated transaction information blocks, a hash operation is performed to obtain a component hash value, and a root hash value may be calculated based on the hash algorithm and the component hash value. For example, if the hash values of the five transaction information blocks are 101, 102, 103, 104 and 105, respectively, the five hash values may be joined to obtain 101102103104105 on which a hash operation is performed to obtain the component hash value.

It is also possible that other values are added to the five hash values respectively and then the hash operation is performed on the jointed results. For example, 5 is added to the above five hash values respectively and the hash values of the five transaction information blocks are updated to 106, 107, 108, 109 and 200; then the hash operation is performed on the jointed results to obtain the component hash value.

If the software to be protected includes multiple components, the component hash value of each of the components may be calculated based on the hash values of the transaction information blocks of each of the components. Then the component hash values of all of the components are jointed, and then the hash operation is performed on the jointed result to obtain the root hash value. The calculation process can refer to the description of FIG. 2 above. By calculating the root hash value, the hash tree shown in FIG. 3 may be obtained.

At S703, the server acquires the header information of the previous information block generated before the information block that needs to be generated currently.

For example, it is currently the 60th day of using the software to be protected, that is, the 60th information block needs currently to be generated, and the previous information block is the information block generated on the 59th day.

The header information of the previous information block may include the root encryption value and the parent encryption value of the previous information block. Optionally, the header information may further include other data, referring to FIG. 5 specifically.

At S704, the server calculates a parent encryption value based on the acquired header information of the previous information block.

It is assumed that the previous information block is the 59th information block, by performing the hash operation on the content included in the header information of the 59th information block, the hash value of the header information of the 59th information block may be obtained, and the hash value of the header information of the 59th information block is the parent hash value of the 60th information block. The parent hash value will be stored in the header information of the 60th information block.

In the example of the present disclosure, the order for performing S702 and S703-S704 is not limited. That is, the root encryption value may be calculated firstly, or the parent encryption value may be calculated firstly, or the both may be calculated concurrently.

At S705, the server generates an information block.

Wherein, the information block may include the root encryption value and the transaction list, and the transaction list includes transaction information blocks generated in order.

Referring to FIG. 3, the server needs to generate the header information, the data portion, and the transaction list of the information block, respectively.

In addition to the parent encryption value and the root encryption value, the header information may further include the encryption value of the information chain. Based on this, the process of generating the information block includes the following operations:

generating the data portion of the information block. Wherein, the data portion of the information block includes the available duration balance of the software to be protected. The encryption value of the information block is calculated based on the data portion of the information block, and the encryption value of the information block is added into the header information of the information block. For example, if the available duration balance of the software to be protected included in the data portion of the information block is 10 days, then an encryption operation may be performed on 10 to obtain the encryption value of the information block.

The data portion of the information block may specifically be the component hash information in the hash tree of FIG. 2, and the hash value of the information block may be obtained by performing a hash operation on the data portion of the information block.

After calculating the root hash value, the parent hash value and the hash value of the information block, the information block as shown in FIG. 3 may be generated.

At S706, the server adds the information block into an information chain; wherein, the information chain includes information blocks generated in order.

In the example of the present disclosure, after generating an information block every day, the server may add the information block to the end of the information chain. In an example, the information chain is serially encrypted and stored.

The above method provided by the present disclosure may be used in the distributed cluster system. If the server has a backup node, each time after generating an information block the server may send the information block to the backup node of the server.

In the method provided by the present disclosure, it is also possible to additionally cache the generated information block by additionally setting a cache space. Therefore, the server may also send the information block to the external cache after each generation of the information block.

In this way, the backup information chain of the information chain may be formed in the backup node and/or the external cache. The server may compare the information chain stored by itself with the backup information chain in the backup node and/or the external cache to determine whether the information chain has been modified, thereby improving the security of the information chain.

With reference to FIG. 6, that the license apparatus 1, the license apparatus 2 and the license apparatus 3 in FIG. 6 are respectively deployed in the server 1, the server 2 and the server 3 is taken as an example, the server 2 and the server 3 are the backup nodes of the server 1. After the server 1 generates an information block, the server 1 may send the information block to the server 2 and the server 3.

In the above example, the server needs to determine the available duration balance of the software to be protected when generating the transaction information block. The available duration balance of the software to be protected may be determined by the following operations:

at an operation 1, the server acquires a current system time and an effective time of the software to be protected;

at an operation 2, the server determines the used duration of the software to be protected based on the difference value between the current system time and the effective time of the software to be protected;

at an operation 3, the server determines the available duration balance of the software to be protected based on the difference value between the total available duration of the software to be protected and the used duration.

For example, the effective time of the software to be protected is Apr. 1, 2020; the effective time may be the time when the software to be protected is first time registered for use; the current system time of the server is Apr. 20, 2020; the total available duration of the software to be protected is 30 days; therefore, it can be determined that the software to be protected has been used for 20 days, and the available duration balance thereof is 10 days.

If the software to be protected includes multiple components, and the effective time and the total available duration of each of the components may be different, the available duration balance of each of the components is determined respectively. For a component, the server determines the available duration balance of the component by the method of: obtaining the current system time and the effective time of the component; determining the used duration of the component based on the difference value between the current system time and the effective time of the component; and then, based on the difference value between the total available duration of the component and the used duration, determining the available duration balance of the component.

Figure 8:
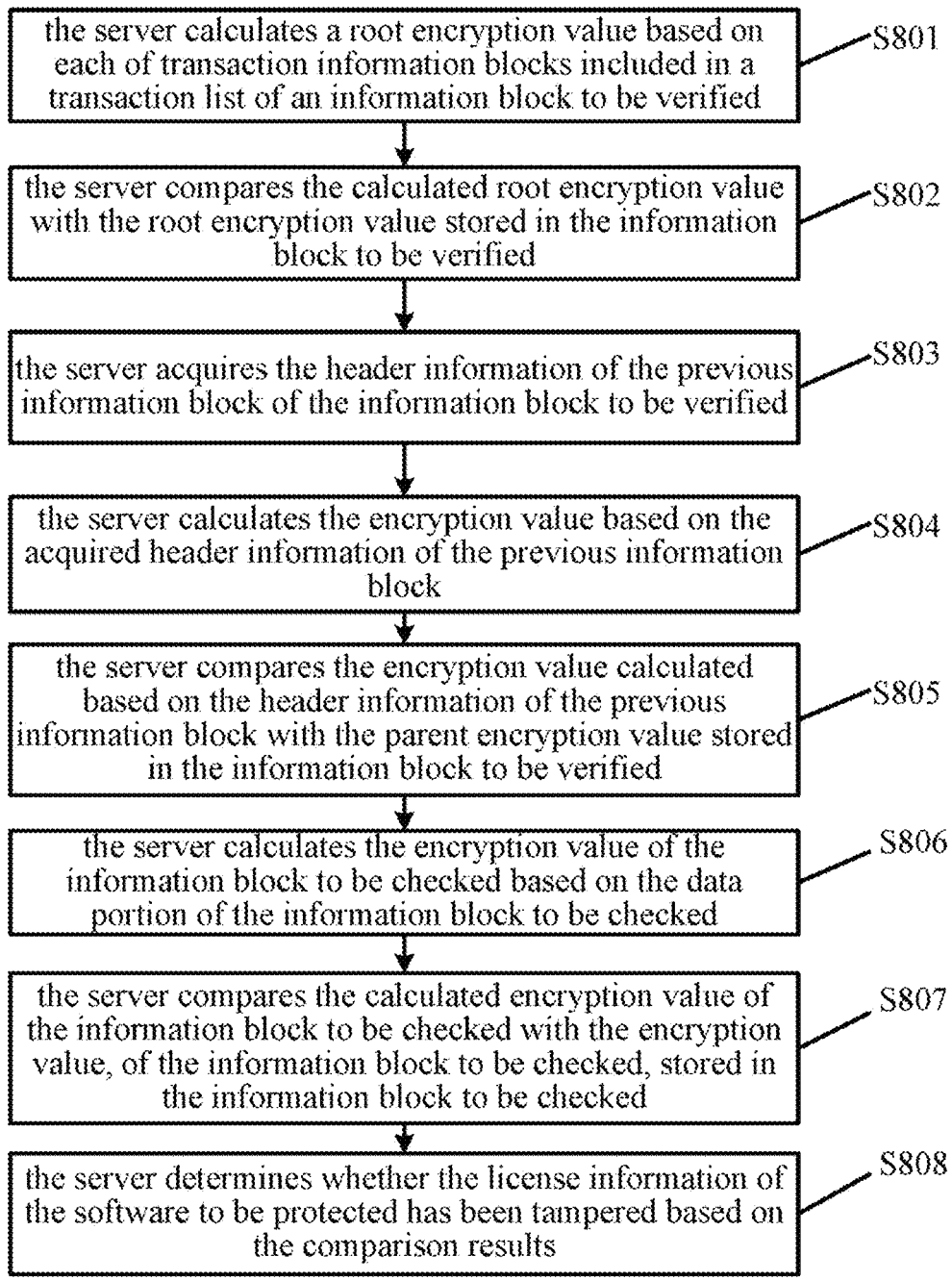
FIG. 8 is another flow chart of a method for monitoring license information of a software provided by an example of the present disclosure.

An example of the present disclosure also provides a method for monitoring license information of a software, which is applied to a server. As shown in FIG. 8, the method includes:

at S801, the server calculates a root encryption value based on each of transaction information blocks included in a transaction list of an information block to be verified.

Wherein, the information block to be verified is an information block that has stored in the information chain. In an example, the information block to be verified is the last information block that has been currently generated.

In the example of the present disclosure, the information block to be verified in the information blocks may be verified once an hour, or, may be verified once by generating every five information blocks. Of course, the frequency of verification is not limited to the above examples, and may be set based on actual conditions, which is not limited in the example of the present disclosure.

For one or more transaction information blocks included in the transaction list of the information block to be verified, the server calculates respectively the encryption value of each of the transaction information blocks based on the license information of each of the transaction information blocks by using a preset encryption algorithm. Then, the server calculates the component encryption value based on the preset encryption algorithm and the above encryption values of the one or more transaction information blocks. Then, the server calculates the root encryption value based on the component encryption value by using the preset encryption algorithm.

The server calculates the component encryption value based on the preset encryption algorithm and the above encryption values of the one or more transaction information blocks, which may be specifically implemented as that: for every preset number of consecutive transaction information blocks in the transaction list of the information block to be verified, the server calculates the paragraph encryption value based on the encryption values of the preset number of consecutive transaction information blocks by using the preset encryption algorithm; then, the server calculates the component encryption value based on the calculated at least one paragraph encryption value by using the preset encryption algorithm.

The method for calculating the root encryption value in this operation is the same as the method for calculating the root encryption value in the process of generating the information block, which can refer to the related description in the above example specifically.

At S802, the server compares the calculated root encryption value with the root encryption value stored in the information block to be verified.

In the example of the present disclosure, if none of the information included in the information block has been tampered, the calculated root encryption value should be the same as the root encryption value stored in the information block to be verified. If the license information included in the information block to be verified is tampered, the calculated root encryption value will be different from the root encryption value stored in the information block to be verified.

In the example of the present disclosure, the verification of the information block to be verified may be completed by means of the root encryption value. In order to further increase the security of the license information, subsequent S803-S805 may also be performed, to verify the information block to be verified by the parent encryption value, and/or, subsequent S806-S807 may also be performed, to verify the information block to be verified by the encryption value of the information block to be verified. Since the parameters used in the above three verification processes are different, in the example of the present disclosure, the order for performing S801-S802, S803-S805 and S806-S807 is not limited, for example, S801 to S807 are performed sequentially in FIG. 8.

At S803, the server acquires the header information of the previous information block of the information block to be verified.

Wherein, the previous information block of the information block to be verified is: the previous information block generated before the information block to be verified is generated.

The header information of the previous information block may include the root encryption value and/or the parent encryption value, and optionally, may further include other information in the header information of the information block shown in FIG. 3.

At S804, the server calculates the encryption value based on the acquired header information of the previous information block.

The method for calculating the encryption value in this operation is the same as the method for calculating the parent encryption value when generating the information block to be verified, which can refer to the related description in the above example, and will not be repeated here.

At S805, the server compares the encryption value calculated based on the header information of the previous information block with the parent encryption value stored in the information block to be verified.

Since in this operation the method for calculating the encryption value is the same as the method of calculating the parent encryption value when generating the information block to be verified, if any information included in the stored header information of the previous information block of the information block to be verified is tampered, the calculated encryption value will be caused to be different from the parent encryption value stored in the information block to be verified.

For S803 to S805, for example, if the information block to be verified is the information block 50, the previous information block of the information block to be verified is the information block 49. The header information of the information block 50 to be verified includes a parent encryption value, and the parent encryption value is an encryption value calculated based on the header information of the information block 49 when generating the information block 50.

During the verification process, the server may acquire the header information of the information block 49, perform the encryption calculation on the header information of the information block 49 acquired at this time, and calculate an encryption value.

Then the server compares the encryption value calculated at this time with the parent encryption value stored in the header information of the information block 50; if the both are different, it means that the header information included in the information block 49 has been tampered, or the parent encryption value stored in the information block 50 has been tampered.

At S806, the server calculates the encryption value of the information block to be verified based on the data portion of the information block to be verified.

In the example of the present disclosure, the data portion of the information block to be verified may include the license information of the software to be protected when generating the information block to be verified. If the software to be protected includes multiple components, the data portion of the information block to be verified includes the license information of each of the components.

The method for calculating the encryption value of the information block to be verified in this operation is the same as the method for calculating the encryption value of the information block to be verified when generating the information block to be verified, which can refer to the related description in the above example, and will not be repeated here.

At S807, the server compares the calculated encryption value of the information block to be verified with the encryption value, of the information block to be verified, stored in the information block to be verified.

Wherein, referring to FIG. 5, if any information in the data portion of the information block to be verified is tampered, this will cause the calculated encryption value of the information block to be verified to be different from the encryption value, of the information block to be verified, stored in the information block to be verified.

At S808, the server determines whether the license information of the software to be protected has been tampered based on the comparison results.

Wherein, in the above S802, S805 and S807, if any of the comparison results is different, it means that the license information of the software to be protected has been tampered.

With the above method for monitoring license information, if the license information included in any of the transaction information blocks of the software to be protected is tampered, this will cause the encryption value of the transaction information block to change, and then cause the root encryption value to change. In the example of the present disclosure, the root encryption value is recalculated based on the transaction list included in the information block to be verified; if the calculated root encryption value is different from the root encryption value stored in the information block to be verified, it can be determined that the license information of the software to be protected has been tampered. It can be seen that the tampering of the license information by the tamperer is easy to be found, and it is more difficult to tamper the same. Without using the hardware information of the host, the security of the license information of the software to be protected is improved.

In addition, if the license information included in the previous information block of the information block to be verified is tampered, this will cause the header information of the previous information block to change, which in turn will cause the encryption value calculated based on the header information of the previous information block to be different from the parent encryption value stored in the information block to be verified. Therefore, by comparing the calculated encryption value with the parent encryption value stored in the information block to be verified, it can be determined whether the previous information block has been tampered. Since each of the information blocks in the information chain includes an encryption value calculated based on the header information of the previous information block thereof, that is, each of the information blocks has a parent encryption value, if the tamperer wants the tampering not to be found, the tamperer needs to modify the parent encryption value included in each of the information blocks, which is very difficult. Therefore, the security of the license information of the software to be protected can be improved by using this method.

Similarly, if the license information of the software to be protected is tampered, this will cause the data portion of the information block to be verified to change, which in turn causes the calculated encryption value of the information block to be verified to be different from the encryption value, of the information block to be verified, stored in the information block to be verified. When the tamperer does not know the encryption algorithm used in the example of the present disclosure, it is difficult to tamper the encryption value of the information block to be verified. Therefore, by comparing the calculated encryption value of the information block to be verified with the stored encryption value of the information block to be verified, it can be determined whether the license information has been tampered, improving the security of the license information.

In another example of the present disclosure, another method for monitoring license information is also provided. The method specifically includes that:

the server determines whether the available duration balance included in each of the transaction information blocks in the transaction list included in the information block to be verified is smaller than the available duration balance included in a preamble transaction information block by comparison; based on the comparison result, the server determines whether the available duration balance of the software to be protected has been tampered.

Wherein, the preamble information block of a transaction information block refers to: the previous transaction information block generated before the transaction information block. For example, if a transaction information block is generated every day, the available duration balance in each of the transaction information blocks included in the transaction list gradually decreases. It is assumed that the transaction list includes the transaction information block 1 to the transaction information block 3, it can be determined, by comparison, whether the available duration balance included in the transaction information block 2 is less than the available duration balance included in transaction information block 1 by 1 day and whether the available duration balance included in the transaction information block 3 is less than the available duration balance included in transaction information block 2 by 1 day.

If the available duration balance included in the transaction information block 3 is 27 and the available duration balance included in the transaction information block 2 is 20, it can be determined that the available duration balance included in the transaction information block 3 is tampered.

In another example of the present disclosure, another method for monitoring license information is also provided. The method includes that:

the server acquires the latest generated information block in the backed-up information chain from the backup node and/or the external cache, compares the information block acquired from the backup node and/or the external cache with the information block to be verified, and determines whether the license information of the software to be protected has been tampered based on the comparison result.

With reference to FIG. 6, that the license apparatus 1, the license apparatus 2 and the license apparatus 3 in FIG. 6 are respectively deployed in the server 1, the server 2 and the server 3 is taken still as an example, the server 2 and the server 3 are the backup nodes. The server 2 may acquires the latest generated information block in the information chain backed-up by the server 3, such as the information block 60. Then, the server 2 compares the information block 60 stored by itself with the acquired information block 60, and if the both are inconsistent, it is determined that the license information in the server 2 and/or the server 3 is tampered.

Further, the server 2 may acquire the information block 60 from the external cache, and compare the information block 60 stored by itself with the information block 60 acquired from the external cache. If the both are consistent, it means that the information block 60 stored in the server 2 is not tampered; if the both are not consistent, it means that the information block 60 stored in the server 2 has been tampered, and the server 2 may replace the information block 60 stored by itself with the information block 60 acquired from the external cache. Alternatively, the server 2 may acquire the entire information chain from the external cache, and replace the information chain stored by itself with the information chain acquired from the external cache, thereby completing the correction of the tampered license information.

Figure 9:
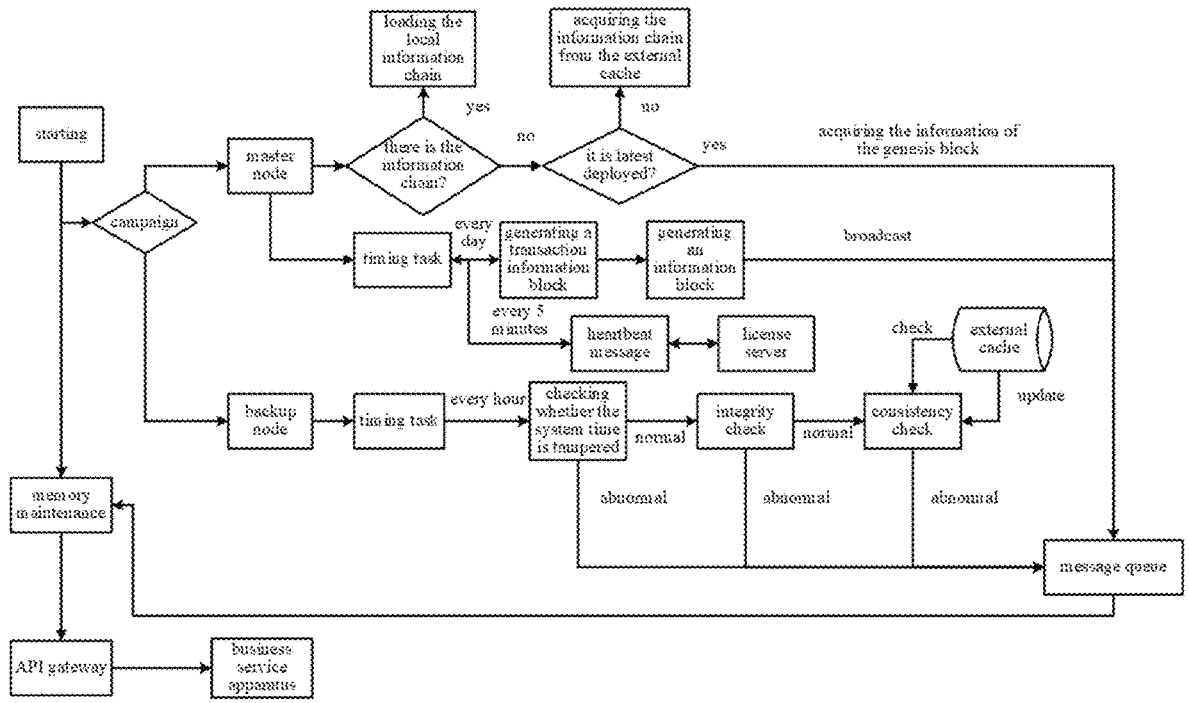
FIG. 9 is an exemplary schematic flow chart of a method for monitoring license information of a software provided by an example of the present disclosure.

The complete process of the example of the present disclosure is described below with reference to FIG. 9. As shown in FIG. 9, when the license apparatus is started, if the distributed cluster system includes multiple license apparatuses, the license apparatuses may determine the master node and the backup nodes through a campaign mechanism.

Then the master node loads the locally encrypted and serially stored information chain. If there is the information chain, it is indicated that it is not the first time to start, and the information chain is normally loaded locally; if there is not the information chain, it is determined whether the software to be protected is new deployed software.

If the software to be protected is new deployed software, the master node acquires the information of the genesis block from a message queue and acquires the total available duration and the number of license nodes of each of the components included in the software to be protected from the license server of the distributed cluster system. Wherein, when deploying the software to be protected, the information of the genesis block may be pre-configured in the message queue. After the master node reads the information of the genesis block from the message queue, the information of the genesis block will be deleted from the message queue. After the user purchases the right to use the software to be protected, the total available duration and the number of licensed nodes of each of the components included in the software to be protected will be stored in the license server. If the user renews the fee to extend the usage period and/or increase the number of licensed nodes, the total available duration and/or the number of the licensed nodes of the software to be protected stored in the license server are updated accordingly.

If the software to be protected is not new deployed software, the master node acquires the existing information chain from the external cache.

Then the master node starts to perform a timing task. As an example, this timing task may trigger the master node to exchange information with the license server through a heartbeat message every 5 minutes to obtain the latest total available duration and the number of licensed nodes of the software to be protected, to ensure the accuracy of the total available duration and the number of license nodes of each of the components used by itself.

The timing task may also trigger the master node to generate a transaction information block for each of the components every day. The master node generates an information block based on the generated transaction information block, and sends the information block to the backup nodes. In another example, the master node may also directly send the information block to the external cache of the master node. The external cache refers to other cache space, which is to back up the information block, inside the master node.

Wherein, the master node may send the information block to the backup nodes and the external cache in a unicast or broadcast manner.

If the master node broadcasts the information block in the broadcast manner, the backup nodes and the external cache may obtain the information block from the message queue and add the information block into the backup information chain. The process for the backup nodes and the external cache to acquire the information block is omitted in FIG. 9.

After the master node generates the information block, the master node also adds the information block into the locally stored information chain to complete the serializable encryption and storage of the information block. The process for adding the information block to the locally stored information chain is omitted in FIG. 9.

For each of the backup nodes, the information block is verified through a timing task. As an example, a backup node may verify the information block once an hour.

Firstly, the backup node checks whether the system time is tampered. The backup node may acquire the transaction list in the information block to be verified, and determine whether the available duration balance included in each of the transaction information blocks in the transaction list is smaller than the available time balance included in the preamble transaction information block by comparison. If the available duration balance included in each of the transaction information blocks in the transaction list is not smaller than the available time balance included in the preamble transaction information block, it is determined that the verification result is abnormal, and it is indicated that the available duration balance in the transaction information block may be incorrect due to the tampering of the system time. If it is determined that the verification result is abnormal, the abnormal condition is broadcast, so that the master node and other backup nodes may learn the abnormal condition based on the received broadcast message.

If the verification result is normal, an integrity check is performed. The integrity check refers to: based on the transaction list included in the information block to be verified, recalculating the root hash value, the parent hash value included in the information block and the hash value of the information block, comparing them with the root hash value, the parent hash value and the hash value of the information block that have been stored in the information block, respectively; and, if any of them is different, determining that the license information is tampered, that is, the verification result is abnormal. Then the abnormal condition is broadcast.

If the verification result is normal, a consistency check is performed. The consistency check refers to: checking whether the information block to be verified stored in the master node is the same as the information block to be verified stored in each of the backup nodes, and whether the information block to be verified stored in the master node and in each of the backup nodes is the same as the information to be verified in the external cache. If any of them is different, it is indicated that the verification is abnormal, that is, the information block to be verified in the master node or in the backup nodes has been tampered. Then the abnormal condition is broadcast.

The above verification order is only an example, and the example of the present disclosure is not limited to performing in the above verification order. The verification method mentioned in the above example may be performed independently or in other orders.

Both the master node and the backup nodes may perform the memory maintenance. That is, the master node and the backup nodes may acquire the abnormal condition of the information block to be verified from the message queue, and may acquire the correct information chain from the external cache through the consistency fault tolerance algorithm to complete the update of the locally stored information chain.

The master node and/or the backup nodes may also provide the license information of each of the components to the business service apparatus through the API gateway, and when it is determined that the license information provided to the business service apparatus is a tampered license information, the master node and/or the backup nodes may also notify the business service apparatus through the API gateway, and send the correct license information to the business service apparatus through the API gateway, so that the business service apparatus performs the license control on each of the components of the software to be protected based on the correct license information.

In combination with the above example, by using the above method for monitoring license information of a software, the information to be protected can be protected from being tampered by the following aspects.

At an aspect 1, the system time is adjusted forward, such that the available duration balance in the latest generated transaction information block becomes longer. In this example of the present disclosure, the available duration balance in the transaction information block may be compared with the available duration balance in the preamble transaction information block in the transaction list. If the available duration balance in the current transaction information block is greater than the available duration balance in the preamble information block, the system time may be corrected in time to store the correct transaction information block. In addition, if the system time is adjusted forward, the timestamp in the latest generated transaction information block will also be smaller than the timestamp in the previous transaction information block, thus the tampering method for forward adjusting the system time can be easily avoided.

At an aspect 2, if the available duration balance in the transaction information block of one of the components of the software to be protected is tampered, this will cause the hash value of the transaction information block to change, which in turn cause the hash value and the root hash value of the information block to change; therefore, by recalculating the hash value and the root hash value of the information block, the tampering will be found, such that the tampered available duration balance cannot make effective.

At an aspect 3, if the component hash information included in the information block is tampered, this will cause the root hash value to change. In addition, the hash value of the information block included in the header information of the information block is generated based on the component hash information of each of the components. If the component hash information is tampered, this will also cause the header information of the information block to change.

The header information of the next information block includes the parent hash value, which parent hash value is the hash value of the header information of the current information block. Therefore, if the component hash information of the current information block is tampered, this will cause the header information of the current information block to change, and will cause the parent hash value included in the next information block incorrect. If it is wanted to make the tampering effective, it is needed to further tamper the parent hash value included in each of the subsequent information blocks, which is more difficult to implement. If it is impossible to modify each of the subsequent information blocks, tampering of the hash information of the component cannot make effective.

At an aspect 4, since the genesis block in the information chain can only be generated once based on the pre-configured genesis information, the genesis block cannot be modified, and the information chain is also serially encrypted and stored, and without decryption, the information chain cannot be directly modified, which further ensures the security of the license information.

At an aspect 5, if the information chain stored in a server is tampered, the verification may also be performed based on the information chain stored in the backup nodes and the external cache, that is, as long as the information chain in the external cache has not been tampered, tampering of the information chain of any server may be found and corrected.

At an aspect 6, if the example of the present disclosure is applied to a containerized scenario, if the container image of the license apparatus is tampered, the information chain that has not been tampered may also be acquired from the container image of other license apparatuses or the external cache, ensuring the security of the license information of the software in the containerized scenario.

Figure 10:
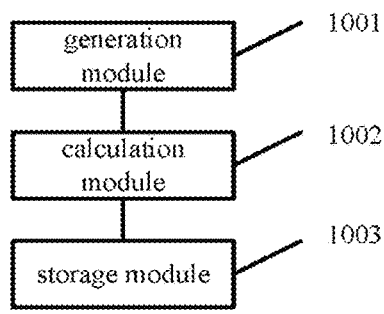
FIG. 10 is a schematic structural diagram of an apparatus for monitoring license information of a software provided by an example of the present disclosure.

Based on the same technical concept, the example of the present disclosure also provides an apparatus for monitoring license information of a software. The apparatus for monitoring license information of a software, that is, the license apparatus referred to in the previous example, can be disposed in a server. Specifically, as shown in FIG. 10, the apparatus includes:

a generation module 1001, to generate a transaction information block every specified duration; wherein, the transaction information block includes license information, and the license information includes an available duration balance of a software to be protected when generating the transaction information block;

a calculation module 1002, to calculate a root encryption value based on the generated transaction information block;

the generation module 1001, is further to generate an information block; wherein, the information block includes the root encryption value and a transaction list, and the transaction list includes transaction information blocks generated in order;

a storage module 1003, to add the information block into an information chain; wherein, the information chain includes information blocks generated in order.

In a possible implementation, the generation module 1001 is specifically to determine the available duration balance of the software to be protected through the following operations:

acquiring a current system time and an effective time of the software to be protected;

determining a used duration of the software to be protected based on a difference value between the current system time and the effective time of the software to be protected;

determining the available duration balance of the software to be protected based on a difference value between a total available duration of the software to be protected and the used duration.

In a possible implementation, the apparatus further includes:

a broadcasting module, to broadcast the information block to a backup node of the server and/or an external cache to form a backup information chain of the information chain in the backup node and/or the external cache.

In an implementation, the information block includes header information, and the header information includes the root encryption value and a parent encryption value;

the calculation module 1002 is further to:

acquire header information of a previous information block generated before the information block;

calculate the encryption value based on the acquired header information of the previous information block.

In an implementation, the generation module 1001 is specifically to:

generate a data portion of the information block; wherein, the data portion includes a current available duration balance of the software to be protected;

calculate an encryption value of the information block based on the data portion of the information block;

add the encryption value of the information block into the header information of the information block.

In an implementation, the calculation module 1002 is specifically to:

for the generated one or more transaction information blocks, calculate respectively an encryption value of each of the transaction information blocks, based on the license information of each of the transaction information blocks by using a preset encryption algorithm;

calculate a component encryption value based on the preset encryption algorithm and the encryption values of the one or more transaction information blocks;

calculate the root encryption value based on the component encryption value by using the preset encryption algorithm.

Based on the same technical concept, the example of the present disclosure also provides an apparatus for monitoring license information of a software. The apparatus for monitoring license information of a software, that is, the license apparatus referred to in the previous example, may be disposed in a server. Specifically, the license information of the software to be protected is stored in the form of an information chain;

the information chain includes information blocks established in order; each of the information blocks includes a transaction list and a root encryption value; wherein, the transaction list includes transaction information blocks generated in order; each of the transaction information blocks include license information; the license information includes an available duration balance of the software to be protected when generating the transaction information block; the root encryption value is obtained by performing encryption based on the license information.

Figure 11:
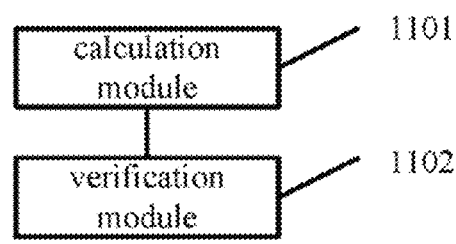
FIG. 11 is another schematic structural diagram of an apparatus for monitoring license information of a software provided by an example of the present disclosure.

As shown in FIG. 11, the apparatus includes:

a calculation module 1101, to calculate a root encryption value based on each of transaction information blocks included in a transaction list of an information block to be verified;

a verification module 1102, to compare the calculated root encryption value with a root encryption value stored in the information block to be verified, and determine whether the license information of the software to be protected has been tampered based on a comparison result.

In an implementation, the information block includes header information, and the header information includes the root encryption value and a parent encryption value; wherein, the parent encryption value is an encryption value obtained by performing a hash operation on the header information of a previous information block generated before a current information block; the apparatus further includes:

an acquisition module, to acquire the header information of the previous information block of the information block to be verified;

wherein, the calculation module 1101 is further to calculate the encryption value based on the acquired header information of the previous information block;

the verification module 1102 is further to compare the encryption value calculated based on the header information of the previous information block with a parent encryption value stored in the information block to be verified, and determine whether the license information of the software to be protected has been tampered based on a comparison result.

In an implementation, the header information of the information block further includes an encryption value of the information block, the encryption value of the information block is an encryption value calculated based on a data portion of the information block, the data portion of the information block includes the license information of the software to be protected when generating the information block;

the calculation module 1101 is further to calculate an encryption value of the information block to be verified based on a data portion of the information block to be verified;

the verification module 1102 is further to compare the calculated encryption value of the information block to be verified with an encryption value, of the information block to be verified, stored in the information block to be verified, and determine whether the license information of the software to be protected has been tampered based on a comparison result.

In an implementation, the calculation module 1101 is specifically to:

for one or more transaction information blocks included in the transaction list of the information block to be verified, calculate respectively an encryption value of each of the transaction information blocks based on license information of each of the transaction information blocks by using a preset encryption algorithm;

calculate a component encryption value based on the preset encryption algorithm and encryption values of the one or more transaction information blocks;

calculate the root encryption value based on the component encryption value by using the preset encryption algorithm.

In an implementation, the calculation module 1101 is specifically to:

for every preset number of consecutive transaction information blocks in the transaction list of the information block to be verified, calculate a paragraph encryption value based on encryption values of the preset number of consecutive transaction information blocks by using the preset encryption algorithm;

calculate the component encryption value based on calculated at least one paragraph encryption value by using the preset encryption algorithm.

In an implementation, the verification module 1102 is further to:

determine whether an available duration balance included in each of the transaction information blocks in the transaction list included in the information block to be verified is smaller than an available duration balance included in a preamble transaction information block by comparison;

based on the comparison result, determine whether the available duration balance of the software to be protected has been tampered.

In an implementation, the acquisition module is further to acquire a latest generated information block in a backed-up information chain from a backup node and/or an external cache, the verification module 1102 is further to compare the information block acquired from the backup node and/or the external cache with the information block to be verified, and determine whether the license information of the software to be protected has been tampered based on a comparison result.

Figure 12:
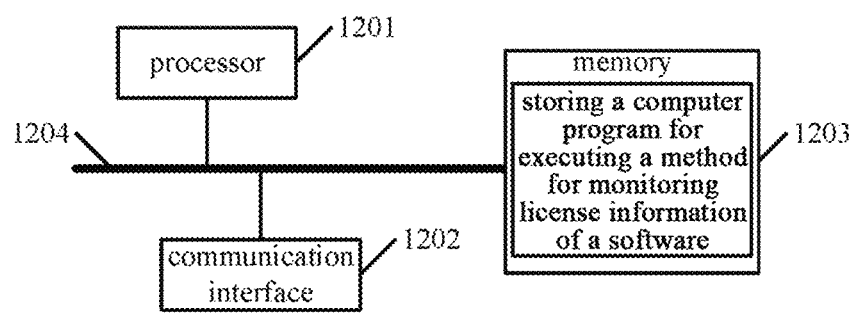
FIG. 12 is a schematic structural diagram of a server provided by an example of the present disclosure.

An example of the present disclosure further provides a server, as shown in FIG. 12, including a processor 1201, a communication interface 1202, a memory 1203 and a communication bus 1204; wherein, the processor 1201, the communication interface 1202 and the memory 1203 communicate with each other via the communication bus 1204;

the memory 1203 is to store a computer program;

the processor 1201 is to, when executing the computer program stored in the memory 1203, implement the operations of the above any method for monitoring license information of a software.

The communication bus in the server may be a peripheral component interconnect (PCI) bus or an extended industry standard architecture (EISA) bus and the like. This communication bus may include an address bus, a data bus, a control bus, or the like. For ease of representation, only one thick line is shown in the figure, which does not represent that there is only one communication bus or one type of communication bus.

The communication interface is used for communication between the above server and other advices.

The memory may include a random access memory (RAM), or may include a non-volatile memory (NVM), for example at least one disk memory. Optionally, the memory may further be at least one storage apparatus located away from the above processor.

The above processor may be a general-purpose processor, including a central processing unit (CPU), a network processor (NP), or the like; the above processor may also be a digital signal processor (DSP), an application specific integrated circuit (ASIC), a field-programmable gate array (FPGA) or other programmable logic device, a discrete gate or transistor logic device, a discrete hardware component.

Another example of the present disclosure further provides a computer readable storage medium. The computer readable storage medium stores a computer program therein. The computer program, when executed by a processor, implements the operations of the above any method for monitoring license information of a software.

Another example of the present disclosure further provides a computer readable storage medium. The computer readable storage medium stores a computer program therein. The computer program, when executed by a processor, implements the operations of the above any method for monitoring license information of a software.

In the above examples, it may be implemented in whole or in part by software, hardware, firmware, or any combination thereof. When implemented in software, it may be implemented in whole or in part in the form of a computer program product. The computer program product includes one or more computer instructions. When the computer program instructions are loaded and executed on a computer, the processes or functions according to examples of the present disclosure are generated in whole or in part. The computer may be a general purpose computer, a special purpose computer, a computer network, or other programmable apparatus. The computer instructions may be stored in a computer readable storage medium or transmitted from one computer readable storage medium to another computer readable storage medium. For example, the computer instructions may be transmitted from a website, computer, server or data center to another website, computer, server or data center by wired (e.g., coaxial-cable, fiber, digital subscriber line (DSL)) or wirelessly (e.g., infrared, wireless, microwave, etc.) manner. The computer readable storage medium may be any available medium that can be accessed by a computer or may be a data storage device, such as a server, data center, or the like, including one or more integrated available mediums. The available mediums may be magnetic medium (e.g., floppy disk, hard disk, magnetic tape), optical medium (e.g., DVD), or semiconductor medium (e.g., solid state disk (SSD)), etc.

It should be noted that the relationship terms used herein, such as "first", "second" and the like are only to distinguish one entity or operation from another entity or operation, but do not necessarily require or imply that there is any actual relationship or order between these entities or operations. Moreover, the terms "include", "comprise", or any other variants thereof are intended to cover a non-exclusive inclusion, such that processes, methods, articles or devices, including a series of elements, include not only those elements that have been listed, but also other elements that are not specifically listed or the elements intrinsic to these processes, methods, articles or devices. Without further limitations, elements limited by the wording "include(s) a/an . . . " or "comprise(s) a/an . . . " do not exclude additional identical elements in the processes, methods, articles or devices, including the listed elements.

All of the examples in the description are described in a correlated manner, and identical or similar parts in various examples can refer to one another. In addition, the description for each example focuses on the differences from other examples. In particular, the examples of the apparatus and the server are described briefly, since they are substantially similar to the example of the method, and the related contents can refer to the description of the example of the method.

The above examples are simply preferable examples of the present disclosure, and are not intended to limit the present disclosure. Any modifications, alternatives, improvements, or the like within the spirit and principle of the present disclosure shall be included within the scope of protection of the present disclosure.

What is claimed is:

1. A method for monitoring license information of a software, applied to a server and comprising:
   generating a transaction information block every duration; wherein, the transaction information block comprises license information, and the license information comprises an available duration balance of a software to be protected when generating the transaction information block, wherein the available duration balances included in transaction information blocks generated in order gradually decrease;
   calculating a root encryption value based on the generated transaction information block;
   generating an information block; wherein, the information block comprises the root encryption value and a transaction list, and the transaction list comprises the transaction information blocks generated in order;
   adding the information block into an information chain; wherein, the information chain comprises information blocks generated in order;
   wherein, the license information of the software to be protected is stored in a form of the information chain;
   each of the information blocks comprises the transaction list and the root encryption value;
   each of the transaction information blocks comprises the license information; the root encryption value is obtained by performing encryption based on the license information;
   the method further comprises:
   calculating the root encryption value based on each of the transaction information blocks comprised in the transaction list of an information block to be verified;
   comparing the calculated root encryption value with the root encryption value stored in the information block to be verified;
   determining whether the license information of the software to be protected has been tampered based on a comparison result,
   wherein, the information block comprises header information, and the header information comprises the root encryption value and a parent encryption value; wherein, the parent encryption value is an encryption value obtained based on header information of a previous information block generated before a current information block; the method further comprises:
   acquiring the header information of the previous information block of the information block to be verified;
   calculating an encryption value based on the acquired header information of the previous information block;
   comparing the encryption value calculated based on the header information of the previous information block with a parent encryption value stored in the information block to be verified;
   determining whether the license information of the software to be protected has been tampered based on a comparison result,
   wherein, the header information of the information block further comprises an encryption value of the information block, the encryption value of the information block is an encryption value calculated based on a data portion of the information block, the data portion of the information block comprises the license information of the software to be protected when generating the information block;
   the method further comprises:
   calculating an encryption value of the information block to be verified based on a data portion of the information block to be verified;
   comparing the calculated encryption value of the information block to be verified with an encryption value, of the information block to be verified, stored in the information block to be verified;
   determining whether the license information of the software to be protected has been tampered based on a comparison result.

2. The method of claim 1, wherein, the available duration balance of the software to be protected is determined through the following operations:
   acquiring a current system time and an effective time of the software to be protected;
   determining a used duration of the software to be protected based on a difference value between the current system time and the effective time of the software to be protected;
   determining the available duration balance of the software to be protected based on a difference value between a total available duration of the software to be protected and the used duration.

3. The method of claim 1, wherein, after generating an information block, the method further comprises:
   broadcasting the information block to a backup node of the server and/or an external cache to form a backup information chain of the information chain in the backup node and/or the external cache.

4. The method of claim 1, wherein, the information block comprises header information, and the header information comprises the root encryption value and a parent encryption value;
   the method further comprises:
   acquiring header information of a previous information block generated before the information block;
   calculating the parent encryption value based on the acquired header information of the previous information block.

5. The method of claim 4, wherein, generating an information block, comprises:
   generating a data portion of the information block; wherein, the data portion comprises a current available duration balance of the software to be protected;
   calculating an encryption value of the information block based on the data portion of the information block;
   adding the encryption value of the information block into the header information of the information block.

6. The method of claim 1, wherein, calculating a root encryption value based on the generated transaction information block, comprises:
   for the generated one or more transaction information blocks, calculating respectively an encryption value of each of the transaction information blocks, based on the license information of each of the transaction information blocks by using a preset encryption algorithm;
   calculating a component encryption value based on the preset encryption algorithm and the encryption values of the one or more transaction information blocks;

calculating the root encryption value based on the component encryption value by using the preset encryption algorithm.

7. The method of claim 1, wherein, calculating a root encryption value based on license information of each of transaction information blocks comprised in a transaction list of an information block to be verified, comprises:

for one or more transaction information blocks comprised in the transaction list of the information block to be verified, calculating respectively an encryption value of each of the transaction information blocks based on license information of each of the transaction information blocks by using a preset encryption algorithm;

calculating a component encryption value based on the preset encryption algorithm and encryption values of the one or more transaction information blocks;

calculating the root encryption value based on the component encryption value by using the preset encryption algorithm.

8. The method of claim 7, wherein, calculating a component encryption value based on the preset encryption algorithm and encryption values of the one or more transaction information blocks, comprises:

for every preset number of consecutive transaction information blocks in the transaction list of the information block to be verified, calculating a paragraph encryption value based on encryption values of the preset number of consecutive transaction information blocks by using the preset encryption algorithm;

calculating the component encryption value based on calculated at least one paragraph encryption value by using the preset encryption algorithm.

9. The method of claim 1, wherein, the method further comprises:

determining whether an available duration balance comprised in each of the transaction information blocks in the transaction list comprised in the information block to be verified is smaller than an available duration balance comprised in a preamble transaction information block by comparison;

determining whether the available duration balance of the software to be protected has been tampered based on a comparison result.

10. The method of claim 1, wherein, the method further comprises:

acquiring a latest generated information block in a backed-up information chain from a backup node and/or an external cache, comparing the information block acquired from the backup node and/or the external cache with the information block to be verified;

determining whether the license information of the software to be protected has been tampered based on a comparison result.

11. A server, comprising a processor, a communication interface, a memory and a communication bus; wherein, the processor, the communication interface and the memory communicate with each other via the communication bus;

the memory is to store a computer program;

the processor is to, when executing the computer program stored in the memory, implement operations of the method of claim 1.

12. A non-transitory computer readable storage medium, storing a computer program therein; wherein, the computer program, when executed by a processor, implements the method of claim 1.

* * * * *